Oct. 15, 1935. E. T. LARKIN 2,017,154
VALVE SEAT CONSTRUCTION FOR ENGINES AND THE LIKE
Filed Sept. 15, 1934
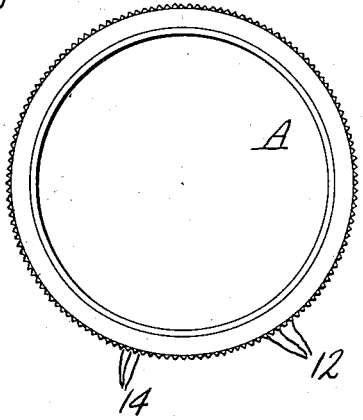
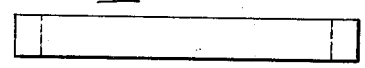
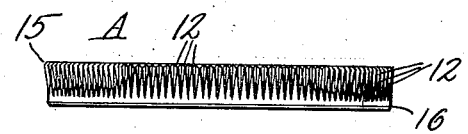
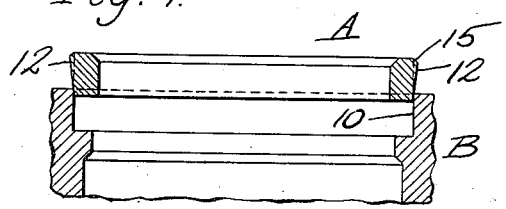
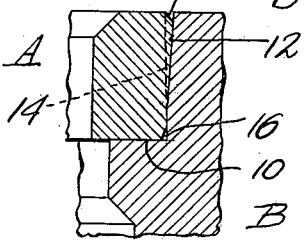
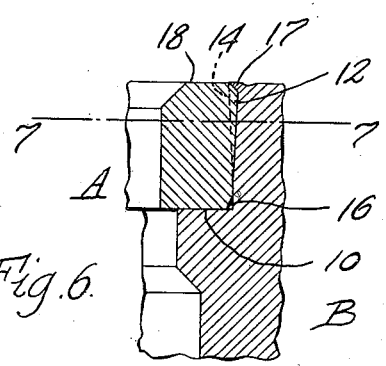
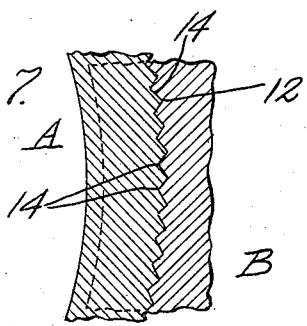
INVENTOR.
Elwood T. Larkin
by Parker, Crochnow & Varner
ATTORNEYS Patented Oct. 15, 1935

2,017,154

UNITED STATES PATENT OFFICE 2,017,154

VALVE SEAT CONSTRUCTION FOR ENGINES AND THE LIKE

Elwood T. Larkin, Eggertsville, N. Y., assignor to Charles A. Criqui, Buffalo, N. Y.

Application September 15, 1934, Serial No. 744,237

12 Claims. (Cl. 123—188)

This invention relates to a construction of valve seats for poppet valves.

The objects of this invention are to provide a valve seat construction in which a valve seat insert can be easily and rigidly secured in a counterbored portion of a cylinder block or head; also to provide a construction of this kind in which the valve seat insert is provided with a tapering notched or serrated surface which securely interlocks with the metal of the cylinder block or head; also to improve the construction of valve seats of this type in other respects hereinafter specified.

In the accompanying drawing:

Fig. 1 is a top plan view of a valve seat insert embodying this invention.

Figs. 2 and 3 are side views of the insert, which is shown in Fig. 2 before the same is provided with the serrations shown in Fig. 3.

Fig. 4 is a section of the insert and adjacent portion of a cylinder block or head to which the seat insert is to be secured, the insert being shown in a position ready to be inserted into its operative position.

Fig. 5 is a fragmentary section of the insert and adjacent part of the cylinder block or head showing the same after the insert has been placed into its operative position.

Fig. 6 is a similar view showing the insert secured to the adjacent portion of the cylinder block or head by forcing the metal of the adjacent portion toward the insert.

Fig. 7 is a fragmentary sectional view on line 7—7, Fig. 6.

In engines using poppet valves, valve seat inserts have been used because of the fact that certain alloys which are very desirable for use in cylinder block or cylinder head castings are unfavorable to valve or valve seat life, and consequently valve seat inserts have been made of material better adapted for cooperation with a valve and have been secured to the adjacent portions of the cylinder blocks or cylinder head castings by various means. The valve seat construction shown in the accompanying drawing overcomes certain objections to constructions of this kind heretofore used.

In accordance with my invention, I provide a ring A of suitable material for use as a valve seat insert, and this ring is machined to fit into a groove or counterbore 10 formed in the part B in which the valve seat insert is to be secured, and which may be either a cylinder block, cylinder head, or other part around the passage controlled by a poppet valve. The outer cylindrical surface of the valve seat insert is then serrated or notched. This may be done in any suitable manner, for example, by means of a knurling tool and the serrations or notches are tapered or inclined with respect to the cylindrical face of the insert, so that they are deepest at the outer face of the valve seat insert on which a valve is to seat, and terminate at a slight distance from the opposite face of the insert. When a valve seat insert is subjected to the action of the knurling tool, the outer cylindrical surface of the valve seat insert is deformed in such a manner that the metal, displaced to form the grooves or depressions in the insert, flows radially outwardly to form corresponding peaks or ridges. Consequently, after this knurling operation, the outside diameter of the insert measured at the peaks will be slightly greater than before the knurling operation. The peaks 12 consequently incline outwardly and extend outwardly to the greatest extent near the surface of the insert, which becomes the valve seat, and also the depressions or grooves 14 are deepest at the surface of the insert which forms the valve seat and the bottoms of the grooves, consequently, incline inwardly toward the axis of the valve and toward the valve seating face. The peaks or crests of the ridges will incline in the opposite direction, since they diverge from the axis of the valve toward the valve seating face of the insert.

In case the valve seat is made of material too hard to be serrated by a knurling operation, the tapering or inclined recesses or grooves may be ground or otherwise cut into the outer surface of the insert and in that case, the insert is preferably initially so machined that the portion of its outer face which is to be serrated is of slightly frusto-conical form instead of the cylindrical form shown in Fig. 2. The portion at the bottom of the insert which is not serrated is of cylindrical form and equal in diameter to the minor diameter of the frusto-conical portion. After the grinding of the depressions or serrations in this outer frusto-conical surface of the valve seat insert, the insert will be the same in shape as that produced by a knurling operation in that the bottoms of the grooves will converge upwardly toward the axis of the valve, while the crests of the teeth will diverge upwardly away from the valve axis.

Preferably the upper outer edge of the valve seat insert is also beveled as indicated at 15.

In applying the insert to the counterbore in the cylinder block or head, any desired means may be employed, such as chilling the insert materially below the temperature of the block or head so as to shrink the insert, or the insert may be forced into its operative position without chilling. To facilitate this operation, a slight bevel 16 may be provided on the edge of the insert adjoining the inner face of the same, since preferably the cylindrical portion 15 is of slightly larger diameter than that of the counterbore.

The construction described is particularly advantageous for rigidly securing the valve seat insert in a cylinder block or head in that the serrations or notches serve not only the purpose of positively preventing the turning of the valve seat insert relatively to the cylinder block or head, but they also result in the embedding of the serrations in the adjacent metal of the cylinder block or head in such a manner as to securely prevent outward movement of the valve seat insert from the counterbore in which it is seated. When the insert is forced into the counterbore, or when after shrinking, it expands in the counterbore, the crests of the serrations or teeth will force or embed themselves in the metal of the cylinder head or block, with the resulting displacement of this metal so that the same enters into the grooves between the ridges. Since the bottoms of the grooves converge upwardly toward the valve axis, it will be obvious that the metal thus forced into these grooves would have to be displaced or moved radially outwardly from the valve axis, if the insert were moved upwardly.

It will also be obvious in referring to Fig. 3, that the grooves in the insert, because of their inclination relatively to the valve axis, are of wedge-shape. Consequently, any metal from the part B which is forced into these grooves will also assume a wedge shape and will thus cooperate with the side walls of the grooves to resist movement of the insert out of the counterbore in the part B. Consequently, a very secure seating of the insert results because of the tapering form of the grooves or serrations.

In addition to locking the insert into its operative position merely by forcing the same into the counterbore, the insert is preferably further secured in place by forcing the upper surface of the cylinder block or head immediately adjacent to the valve seat insert toward the insert. This may be done either by rolling, peening, or rivetting action, so that some of the metal of the cylinder block or head is forced over against the inclined or beveled face 15 of the insert as indicated at 17, Fig. 6, and by this action some of the metal will also enter into the widest and deepest ends of the grooves of the insert. In this manner, an absolutely rigid connection between the insert and the cylinder block or head results.

After securing the valve seat insert in place in the cylinder block or head, the outer face 18 thereof against which a valve will seat, may be machined or finished in the usual manner.

The valve seat construction described has the advantages of being simple and inexpensive both in the forming of the insert and in the securing of the same in a cylinder block or head. The construction described makes it possible to machine the valve seat inserts with considerably greater tolerances, since an absolutely secure connection with the cylinder head or block is assured, and since a close or intimate contact of the insert with the head or block results, which is desirable for the convection of heat from the insert to the cylinder block or head. By serrating the outer edge of the insert and embedding the teeth thus formed, a more extended surface of contact is formed between the insert and the cylinder block or head, so that heat can more readily pass from the valve seat insert to the block or head, which is very desirable, since the valve seat inserts are generally subjected to greater heat than other parts of the cylinder block or head.

I claim as my invention:

1. A valve seat insert construction for cylinder blocks or heads, including an insert provided on its outer surface with tapering grooves and teeth arranged with bottoms of the grooves converging toward the axis of the insert and toward the face of the insert on which a valve is to seat and the peaks of the teeth diverging from the axis of the insert toward the face of the insert on which a valve is to seat, the metal of the cylinder block or head being forced into the grooves formed on the insert for holding said insert against any movement relatively to said cylinder block or head.

2. A valve seat insert construction for cylinder blocks or heads, including a valve seat insert member arranged to seat in a counterbore in a cylinder block or head, said valve seat insert having the outer edge of the seat portion thereof beveled, a plurality of tapering grooves formed on the peripheral part of said insert, a portion of the metal of the cylinder block or head being forced into said grooves and into contact with said beveled portion of the insert.

3. A valve seat insert construction for cylinder blocks or heads, including a valve seat insert member arranged to seat in a counterbore in a cylinder block or head, said valve seat insert having the outer edge of the seat portion thereof beveled, a plurality of tapering grooves formed on the peripheral part of said insert, and having their greatest depth at said beveled portion, a portion of the metal of the cylinder block or head adjacent to said insert being forced into said grooves and against said beveled portion.

4. A valve seat insert construction for cylinder blocks or heads, including a valve seat insert member arranged to seat in a counterbore in a cylinder block or head and having a plurality of tapering grooves formed on the peripheral part of said insert and having their deepest portions adjacent to the valve seating face of the insert, a portion of the metal of the cylinder block or head being forced into said grooves.

5. A valve seat insert construction for cylinder blocks or heads, including a valve seat insert member arranged to seat in a counterbore in a cylinder block or head and having a plurality of tapering grooves formed on the peripheral part of said insert and having their deepest portions adjacent to the valve seating face of the insert, said grooves terminating short of the opposite face of the insert, a portion of the metal of the cylinder block or head being forced into said grooves.

6. A valve seat construction for cylinder blocks or heads, including a valve seat insert member arranged to seat in a counterbore in a cylinder block or head and having a plurality of teeth extending outwardly on the peripheral part of said insert, said teeth being of greatest height adjacent to the valve seating face of the insert and gradually decreasing in height toward the opposite face of said insert, said teeth being embedded in the metal of the cylinder block about the counterbore to force some of said metal into the spaces between teeth.

7. A valve seat insert of ring shape and having a plurality of tapering grooves formed on the peripheral part of said insert, said grooves being of greatest depth at the portion of said insert adjacent to the valve seating face thereof.

8. A valve seat insert of substantially ring shape and having its outer periphery provided with a plurality of teeth which are of greatest height at the portions thereof adjacent to the valve seating face of said insert and the height of which gradually decreases toward the opposite face of said insert.

9. A valve seat insert of substantially ring shape having its peripheral portion provided with alternately arranged inclined teeth and grooves, the grooves being of greatest depth and the teeth of greatest height adjacent to the valve seating face of said insert, said grooves decreasing in depth and said teeth decreasing in height toward the opposite face of said insert.

10. A valve seat insert of substantially ring shape and having its outer periphery serrated to provide a plurality of teeth which are of greatest height at the portions thereof adjacent to the valve seating face of said insert and the height of which gradually decreases toward the opposite face of said insert, and an unserrated cylindrical portion on the peripheral part of said valve seat insert toward which the teeth taper and at which they terminate.

11. A metal insert adapted to be secured in a shallow recess in another metal member, said insert being provided with a peripheral surface adapted to coact with the wall of the recess for holding said insert in place therein, said peripheral surface being provided with tapering grooves and teeth arranged with the bottoms of the grooves converging toward the axis of the insert and toward the outer face of the insert, and the peaks of the teeth diverging from the axis of the insert toward the outer face thereof, the metal of said other metal member being forced into the grooves formed on the insert by pressing said insert into said recess and interlocking with said converging grooves to prevent displacement of said insert out of said shallow recess.

12. A metal insert adapted to be secured in a shallow recess in another metal member, said insert having the peripheral portion thereof provided with alternately arranged inclined teeth and grooves, the grooves being of greatest depth and the teeth of greatest height adjacent to the outer face of said insert, said grooves decreasing in depth and the teeth decreasing in height toward the inner face of said insert.

ELWOOD T. LARKIN.